United States Patent [19]

Seader

[11] 4,234,391
[45] Nov. 18, 1980

[54] CONTINUOUS DISTILLATION APPARATUS AND METHOD

[75] Inventor: Junior D. Seader, Salt Lake City, Utah

[73] Assignee: University of Utah, Salt Lake City, Utah

[21] Appl. No.: 950,969

[22] Filed: Oct. 13, 1978

[51] Int. Cl.³ .................. B01D 3/32; B01D 1/28
[52] U.S. Cl. .................. 203/26; 203/100; 203/DIG. 4; 203/75; 203/77; 62/30; 62/31; 165/105; 202/154; 202/158; 585/800
[58] Field of Search .............. 202/158, 174, 154, 235, 202/205; 203/74, 75, 77, 71, 80, 73, 24, 26, 100, DIG. 4; 196/105, 139, 134; 62/30, 31, 39; 165/105; 126/433; 585/800

[56] References Cited

U.S. PATENT DOCUMENTS

| | | | |
|---|---|---|---|
| 1,690,108 | 11/1928 | Grady | 165/105 |
| 1,915,681 | 6/1933 | Luster | 202/158 |
| 2,040,431 | 5/1936 | Dean et al. | 202/158 |
| 2,134,882 | 1/1938 | Monro | 202/154 |
| 2,152,164 | 3/1939 | Wentworth | 203/26 |
| 2,760,351 | 8/1956 | Schilling | 202/154 |
| 3,414,484 | 12/1968 | Carson | 203/26 |
| 3,563,047 | 2/1971 | Hoffman | 62/39 |
| 3,575,007 | 4/1971 | Gunther | 203/26 |
| 3,875,019 | 4/1975 | Cocuzza et al. | 203/26 |
| 4,025,398 | 5/1977 | Haselden | 202/158 |
| 4,033,406 | 7/1977 | Basiulis | 165/105 |
| 4,037,786 | 7/1977 | Munroe | 165/105 |

*Primary Examiner*—Wilbur L. Bascomb, Jr.

[57] ABSTRACT

A continuous distillation apparatus and method, the apparatus including separate stripping and rectifying sections in tandem, each of which are segregated into a plurality of vapor/liquid contact stages. The rectifying section is operated at a higher temperature than the stripping section by compressing vapor from the stripping section prior to introducing the vapor into the rectifying section. Thermal energy is conserved during the distillation process by transferring thermal energy from the rectifying section to the stripping section with a plurality of heat pipes.

5 Claims, 4 Drawing Figures

CONTINUOUS DISTILLATION APPARATUS AND METHOD

BACKGROUND

1. Field of the Invention

This invention relates to a continuous distillation apparatus and method and, more particularly, to a continuous distillation apparatus and method wherein the rectifying section and the stripping section are configurated as separate chambers with the rectifying section being operated at a higher temperature than the stripping section and heat pipes are used to transfer thermal energy from the rectifying section to the stripping section.

2. The Prior Art

Distillation is the single most important separation unit operation in the process industry. It is widely used to upgrade feed stocks, separate reaction intermediates, and purify products in processes ranging from cryogenic separation of oxygen, nitrogen, and helium to the recovery of aromatics from coal. In a recent study of the distillation processes in a number of refineries and chemical plants, distillation was determined to be an important energy consumer in almost every refinery and chemical plant. In petroleum refineries, which are the largest energy consumers on a per plant basis, crude and vacuum distillation alone accounts for between 22.5 and 51% of the total energy consumed. Accordingly, any enhancement of the energy balance for a distillation unit operation will have a significant impact on a wide cross section of the process industry.

In the conventional distillation column, heat is supplied in a reboiler and removed through a condenser with the operating temperature of the reboiler being substantially higher than the operating temperature of the condenser. Accordingly, thermal energy is introduced into the distillation column at the highest temperature end (the reboiler), and removed from the distillation column at the lowest temperature end (the condenser). Because of this temperature differential between the reboiler and the condenser, the separation of components is always accompanied with a degradation of energy even when heat leaks and other losses are excluded. Therefore, the conventional distillation process, when viewed as a thermodynamic process, is notoriously inefficient. Values as low as 1.9% have been reported for the thermodynamic efficiency of industrial distillation columns.

With particular reference to FIG. 1, a typical, prior art, continuous distillation or fractionating column equipped with the necessary auxiliary equipment and containing rectifying and stipping sections is shown. The column A is fed near its center with a feed of definite concentration. The feed is assumed to be a liquid at or near its boiling point. The plate on which the feed enters is called the feed plate. All plates above the feed plate constitute the rectifying section, and all plates below the feed, including the feed plate itself, constitute the stripping section. The liquid in the feed flows down the stripping section to the bottom of the column where a definite liquid level is maintained.

Liquid is removed from the stripping section and flows by gravity to reboiler B that generates vapor and returns the vapor to the bottom of the stripping section portion of the column. The reboiler may be of the kettle (as shown), thermosyphon, forced circulation, etc., type. The bottom product may undergo further processing or may flow (as shown) through a cooler H which also preheats the feed by heat exchange therewith.

Vapor from reboiler B passes up the entire column through both the stripping and rectifying sections and is removed from the column and partially or totally condensed in a condenser C. The condensate is collected in an accumulater D from which reflux pump F removes liquid and delivers it to the top plate of the rectifying section. This liquid stream is called reflux and provides the down-flowing liquid in the rectifying section necessary to act on the up-flowing vapor. Reflux liquid provides the required rectification since no rectification would occur in the rectifying section without the reflux. Without rectification the concentration of the overhead product would be no greater than in the vapor rising from the feed plate. Condensate from accumulator D that is not picked up by the reflux pump F is withdrawn as overhead product and may be cooled in a heat exchanger E, called the product cooler. If no azeotropes are encountered, both overhead and bottom products may be obtained in any desired purity if enough plates and adequate reflux are provided.

It should be emphasized again that thermal energy is removed from the vapor in condenser C at a lower temperature than the thermal energy introduced into reboiler B. Accordingly, in the absence of any external device, it is not possible to transfer the low temperature thermal energy removed from condenser C into the higher temperature environment of reboiler B.

The distillation system shown in FIG. 1 is usually simplified, especially in general chemical laboratories. For example, in place of the reboiler, a heating coil is placed in the bottom of the column and is used to generate vapor from the pool of liquid there. The condenser may also be placed above the top of the column with the reflux pump and accumulator omitted. Reflux then returns to the top plate by gravity while a special valve, called a reflux splitter, is used to control the rate of reflux return while the remainder of the condensate forms the overhead product.

Various methods for increasing the thermodynamic efficiency of the distillation process are known and are discussed in numerous publications and include, for example, vapor recompression, vapor reuse, secondary reflux, and split tower configurations. Additional information regarding conventional distillation apparatus may be found in *Unit Operations of Chemical Engineering*, McCabe, W. L., and Smith, J. C., McGraw-Hill Book Company, Inc., New York, 1956.

Additional information on fractional distillation, including more efficient apparatus, can be found in a publication *Elements of Fractional Distillation*, Robinson, C. S. and Gilliland, E. R., fourth edition, McGraw-Hill Book Company Inc., New York (1950).

Historically, energy supplies from fossil fuels (notably natural gas and petroleum) have been both cheap and plentiful, and it has, therefore, been difficult to justify the additional capital equipment and fabrication costs necessary to enhance the thermodynamic efficiency of the distillation column. However, recent increases in the cost of energy (particularly that derived from natural gas and petroleum) has placed an increased emphasis on enhancing distillation column thermodynamic efficiency or providing alternative low energy separation techniques that formerly could be dismissed summarily on economic grounds.

A new distillation scheme using secondary reflux and vaporization to enhance thermodynamic efficiency is discussed in a paper "Distillation with Secondary Reflux and Vaporization: A Comparative Evaluation" by Mah, R. S. H., Nicholas, Jr., J. J., and Wodnik, R. B., AIChE Journal, Volume 23, Number 5, September, 1977 (pages 651–658).

In view of the foregoing, it would be a significant advancement in the art to provide a continuous distillation/separation apparatus and method whereby thermal energy is transferred from the rectifying section to the stripping section in a continuous distillation apparatus. Such an apparatus and method based on the use of heat pipes is set forth herein.

BRIEF SUMMARY AND OBJECTS OF THE INVENTION

The present invention relates to a novel continuous distillation apparatus and method whereby energy is conserved by transferring thermal energy from the rectifying section to the stripping section. A plurality of heat pipes serve as the heat transfer apparatus for transferring the thermal energy from the rectifying section to the stripping section. The rectifying section is operated at a higher temperature than the stripping section by compressing vapor from the stripping section prior to introducing the vapor into the rectifying section.

It is, therefore, a primary object of this invention to provide improvements in continuous distillation apparatus.

Another object of this invention is to provide improvements in the method of conserving energy while separating a multicomponent fluid system.

Another object of this invention is to provide an improved continuous distillation apparatus whereby energy is conserved by transferring thermal energy from the rectifying section to the stripping section with heat pipe apparatus.

Another object of this invention is to provide a continuous distillation column configured as a vertically oriented, vertically divided column having a rectifying section on one side of the column and a stripping section on the other side of the column.

Another object of this invention is to provide a continuous distillation apparatus with each of the stripping sections and the rectifying sections configured as separate, closed vessels having heat pipes therebetween for transferring thermal energy from the rectifying section to the stripping section.

These and other objects and features of the present invention will become more fully apparent from the following description and appended claims taken in conjunction with the accompaning drawing.

DETAILED DESCRIPTION OF THE PREFERRED EMBODIMENTS

Figure 1:
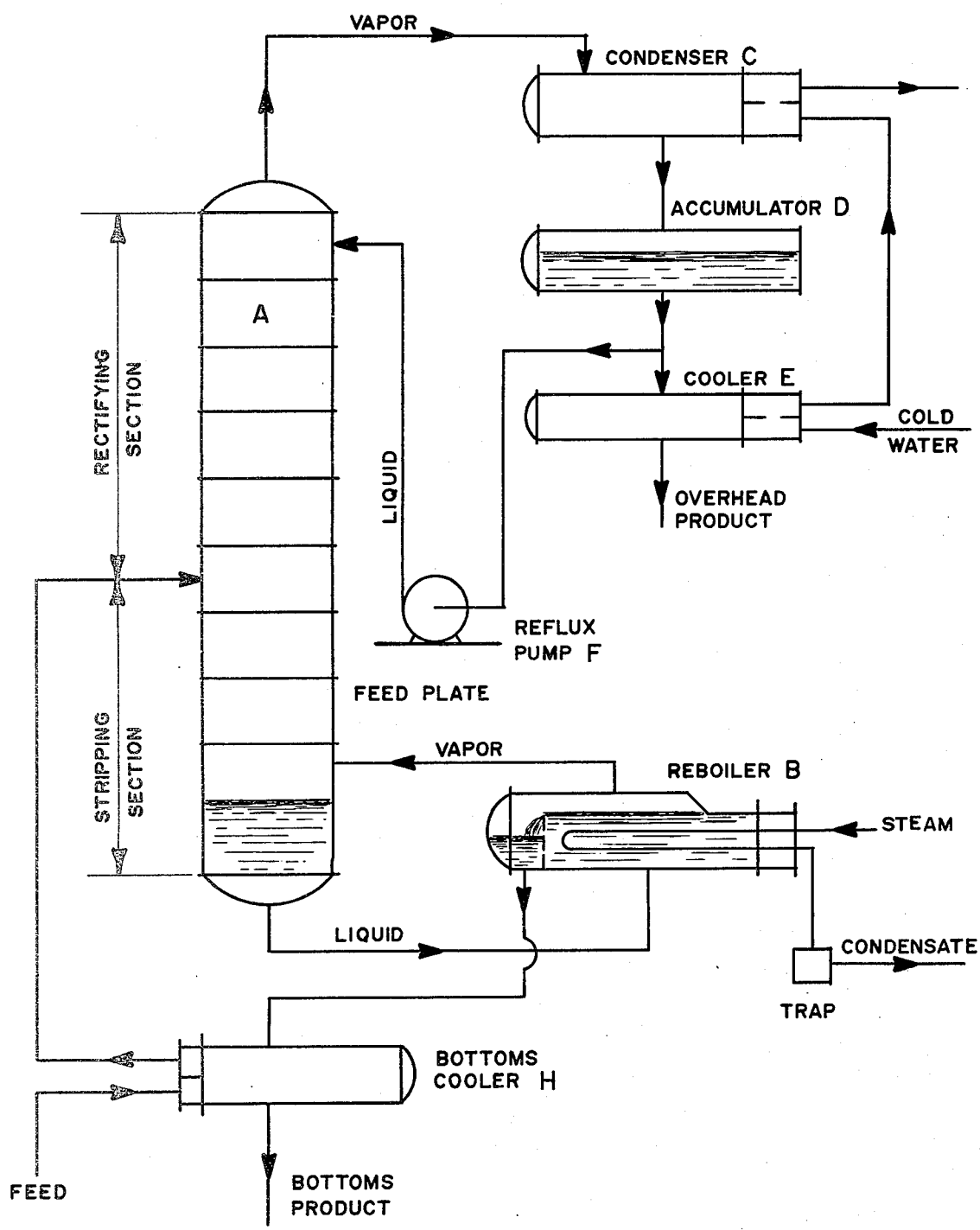
FIG. 1 is a schematic flow diagram of a prior art, continuous distillation column with rectifying and stripping sections in the same vessel.

The invention is best understood by reference to the drawing where like parts are designated with like numerals throughout.

Figure 2:
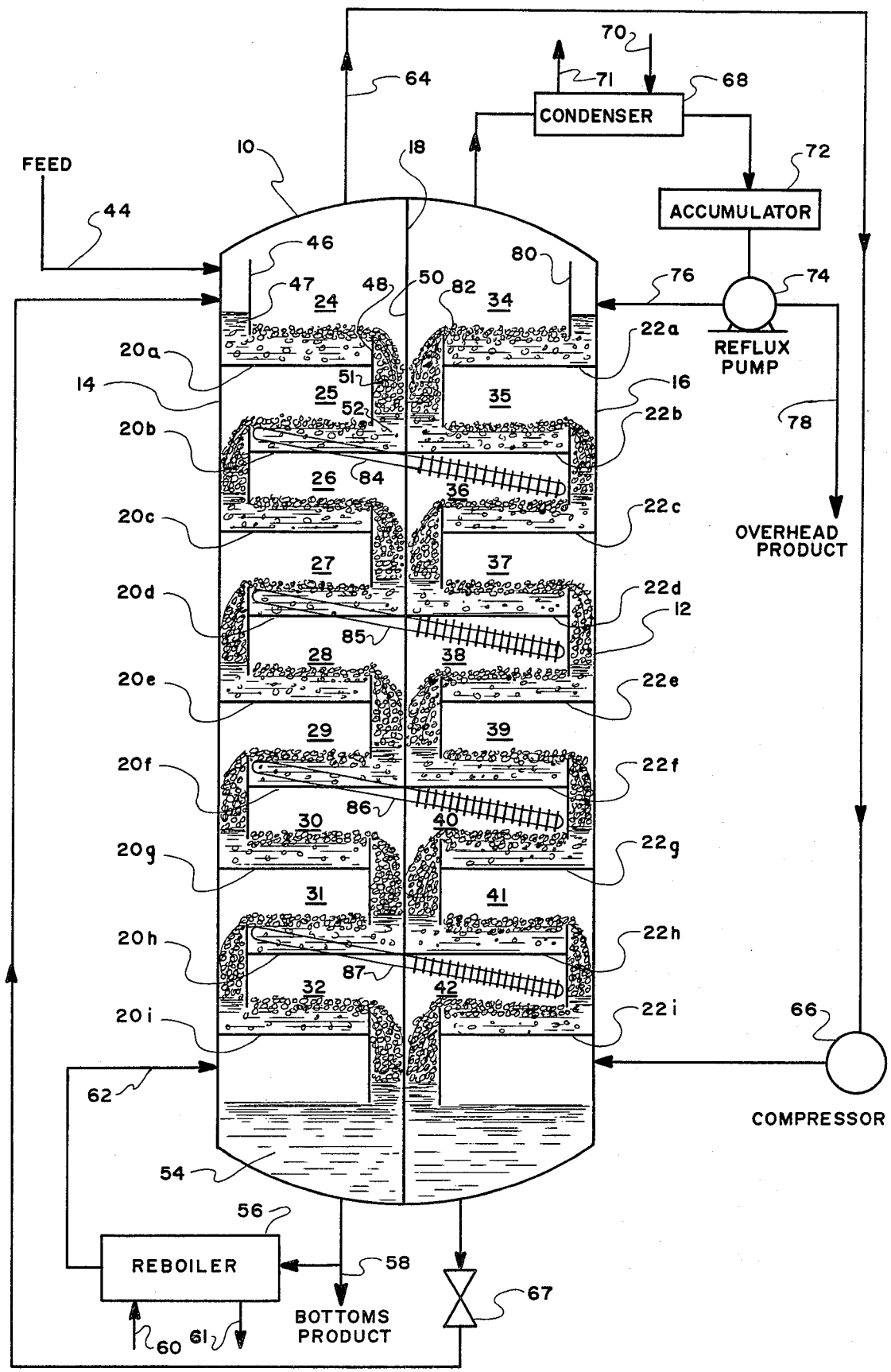
FIG. 2 is a schematic, vertical cross section of a first preferred embodiment of the continuous distillation apparatus of this invention illustrating the orientation of the rectifying section, stripping section and heat pipes.

Referring now more particularly to FIG. 2, the distillation or fractionating apparatus of a first preferred embodiment of this invention is shown generally at 10 and includes a vertically oriented column 12 configurated as a closed vessel and separated by a divider 18 into a stripping section 14 and a rectifying section 16. Stripping section 14 is segregated into a plurality of vapor/liquid contacting stages 24–32 by trays 20a–20i, respectively. Correspondingly, rectifying section 16 is segregated into a plurality of vapor/liquid contact stages 34–42 by trays 22a–22i, respectively.

Each of vapor/liquid contacting stages 24–32 and 34–42 are conventional vapor/liquid contact stages and will be briefly described herein with the understanding that further description is unnecessary since the stages are conventional. Feed in the form of a multicomponent liquid stream is introduced into stripping section 14 through an inlet 44 and forms a hydrostatic column, for example, behind an inlet weir 46. The liquid flows under weir 46 and across tray 20a thereafter over an overflow weir 48. Vapor from vapor/liquid contacting stage 25 rises upwardly through perforations (not shown) in tray 20a causing an intimate mixing and otherwise frothing of liquid on tray 20a. The overflowing liquid/froth from tray 20a collects in a downcomer 50 where it segregates into an upper froth section 51 and a liquid column 52 prior to the liquid flowing across tray 20b. The foregoing sequence is repeated for each of the remaining vapor/liquid contacting stages 25–32 until the liquid residue collects as a reservoir 54 of liquid in the bottom portion of stripping section 14. The liquid is drawn from reservoir 54 and either directed as feed to reboiler 56 or is drawn off as bottom product through outlet 58. Clearly, other arrangements to separate bottom product from reboiler feed can also be employed.

Reboiler 56 is configured as a conventional reboiler having an inlet line 60 for any suitable heating medium such as steam, etc., and an exit line 61. The heating medium provides thermal energy to vaporize liquid as boilup vapor in reboiler 56 prior to introducing the boilup vapor through recycle line 62. Thereafter, the boilup vapor rises upwardly through each of vapor/liquid contacting stages 32–24 as in the manner previously set forth hereinbefore and combines with feed vapor to provide contacting vapor to rectifying section 16.

Vapor leaving the top of stripping section 14 is directed by pipe 64 to compressor 66. Compressor 66 suitably compresses the vapor prior to its being introduced into the bottom portion of rectifying section 16. Importantly, compressor 66 imparts sufficient pressure to vapor introduced into rectifying section 16 so that rectifying section 16 operates at a higher temperature than stripping section 14. Compressed vapor introduced by compressor 66 rises upwardly through each of vapor/liquid contacting stages 42–34 in a manner similar to the operation of stripping section 14.

Overhead vapor is removed from rectifying section 16 where it is condensed in condenser 68 by a suitable coolant passing between inlet 70 and outlet 71. The condensed vapor is accumulated in an accumulator 72 with a portion being returned as a liquid by a reflux pump 74 through a reflux return line 76. The remainder of the condensed vapor in accumulator 72 is removed through an outlet 78 as an overhead product. Alternatively, a vapor distillate can be removed from accumulator 72.

The reflux liquid returned through inlet 76 is introduced into the vapor/liquid contact stage 34, for example, behind a weir 80 where it flows across tray 22a and over a weir 82. The countercurrent-like flow of liquid and vapor through stages 34-42 is substantially identical as in stages 24-32 of stripping section 14.

A plurality of heat pipes, shown herein schematically as heat pipes 84-87, transect divider 18 for the purpose of transmitting thermal energy from the various vapor/liquid contacting stages in rectifying section 16 into stripping section 14. Heat pipes 84-87 are configured as a plurality of conventional heat pipe apparatus which are sealed, two phase heat transfer devices and incorporate some form of capillary or osmotic forces to return heat pipe condensate to the heat pipe evaporator.

Heat pipe 84 is a representative heat pipe and may be configurated with a plurality of fins 84a to provide an enlarged heat transfer surface at the heat pipe evaporator end. Fins 84a reside in rectifying section 16 where they extend into the vapor portion of liquid/vapor contacting stage 36. In this manner, upwardly rising vapor in liquid/vapor contacting stage 36 condenses on fins 84a absorbing the thermal energy released from the vapor into heat pipe 84. The thermal energy absorbed by heat pipe 84 is thereby transferred according to conventional heat pipe technology from rectifying section 16 to stripping section 14. The opposite or upper end of heat pipe 84 is immersed in the liquid/froth portion of liquid/vapor contacting stage 25 so that the thermal energy is removed therefrom by the liquid/froth mixture. While only a single heat pipe 84 is illustrated, it is particularly understood that heat pipe 84 could be selectively configurated as a plurality of heat pipes in any suitable array and transecting divider 18.

Furthermore, while heat pipes 84-87 are shown bridging between vapor/liquid contacting stages 36 and 25; 38 and 27; 40 and 29; and 42 and 31, respectively, it should be specifically understood that additional heat pipes (not shown) could also be provided between liquid/vapor contacting stages 35 and 24; 37 and 26; 39 and 28; and 41 and 30, respectively. However, for ease of illustration and understanding of the present invention, only heat pipes 84-87 are illustrated herein. Additionally, while trays 20a-20i are shown as substantially coplanar with trays 22a-22i, respectively, the relative positions of the respective trays in each of stripping section 14 and rectifying section 16 may be selectively offset, if desired, to provide the appropriate orientation of heat pipes 84-87.

Generally, the operation of heat pipes 84-87 requires that the heat evolution end be higher than the heat absorption end by nature of the functional characteristics of the conventional heat pipe. In particular, a working fluid is contained within the enclosed heat pipe and, upon absorption of thermal energy, is vaporized and travels upwardly to the heat evolution end. At the heat evolution end, the vaporized working fluid condenses giving up its heat of condensation and then migrates under gravity, along a wick, back to the lower, heat absorption end. This latter information is conventional heat pipe technology. However, heat pipe technology has advanced sufficiently whereby any suitable heat pipe orientation may be employed using the appropriate heat pipes.

From the foregoing, it should be clear that the apparatus and method of this invention provides significant energy savings since rectifying section 16 is operated at a higher temperature than stripping section 14 thereby accommodating transfer of thermal energy from rectifying section 16 into stripping section 14. Since rectifying section 16 is operated at a higher pressure than stripping section 14, a constriction valve 67 is incorporated into the outlet for liquid from rectifying section 16 prior to returning the same to stripping section 14. Alternatively, a power-recovery turbine (not shown) can be substituted for valve 67 thereby further enhancing thermodynamic efficiency.

While the primary heat transfer mechanism is provided by heat pipes 84-87, additional thermal energy is transferred from rectifying section 16 to stripping section 14 through divider 18. However, reliance on heat transfer through divider 18 alone is believed to be inadequate, and therefore, heat pipes 84-87 are preferentially included in the apparatus and method of this invention. From the foregoing, it should be clear that the continuous distillation apparatus and method of this invention utilizes and recovers thermal energy in a more efficient manner by creating secondary reflux and vaporization through internal heat exchange at spaced locations in column 12 as well as at the ends of column 12.

By way of illustration of the apparatus and method, the following nonlimiting example, taken from the previously cited reference of Mah, et al., is set forth:

EXAMPLE I

An equimolal feed mixture of ethylene and ethane at a flow rate of 0.126 kgmole/sec is separated into 99 mole percent pure products with 30 stages. The rectifying section operates at 911.0 kPa and the stripping section at 304.0 kPa. By transferring heat between various stages of this invention, the following reductions are made over conventional distillation:

External reflux ratio: 43.4%
Reboiler duty: 39.8%
Condenser duty: 50.2%
Steam: 56.4%
Cooling water: 75.3%

The reduction in steam is made despite the additional 50.9 kw watts (as steam) required by compressor 66 for moving boilup vapor from stripping section 14 to rectifying section 16.

A further comparison is made in the following Table I between the conventional distillation column with the apparatus of this invention:

TABLE I

COMPARISON OF CONVENTIONAL DISTILLATION WITH DISTILLATION UTILIZING SECONDARY REFLUX AND BOILUP (PRESENT INVENTION) FOR THE SEPARATION OF ETHYLENE AND ETHANE

| Subject of Comparison | Conventional System | Present Invention |
|---|---|---|
| Rectifier Pressure, kPa | 304.0 | 911.9 |
| Stripper Pressure, kPa | 304.0 | 304.0 |
| Condenser Temperature, °K | 191.2 | 218.9 |
| Reboiler Temperature, °K | 207.7 | 207.7 |
| Reboiler Duty, kW | 2,482 | 1,495 |
| Condenser Duty, kW | 2,150 | 1,070 |
| Compressor Duty, kW | — | 509 |
| External Reflux Ratio | 2.652 | 1.500 |

TABLE I-continued
COMPARISON
OF CONVENTIONAL DISTILLATION WITH
DISTILLATION UTILIZING SECONDARY REFLUX AND
BOILUP (PRESENT INVENTION) FOR THE SEPARATION
OF ETHYLENE AND ETHANE

| Subject of Comparison | Conventional System | Present Invention |
| --- | --- | --- |
| Total Steam Requirement, kg/s | 19.42 | 8.46 |
| Total Cooling Water Requirement, kg/s | 132.19 | 32.62 |

The foregoing comparison is set forth herein for the purpose of emphasizing the increase in thermodynamic efficiency of a distillation system using secondary reflux. Clearly, therefore, the present invention is significant in that it discloses a novel apparatus and method for transferring thermal energy from the rectifying section to the stripping section with heat pipe apparatus.

Figure 3:
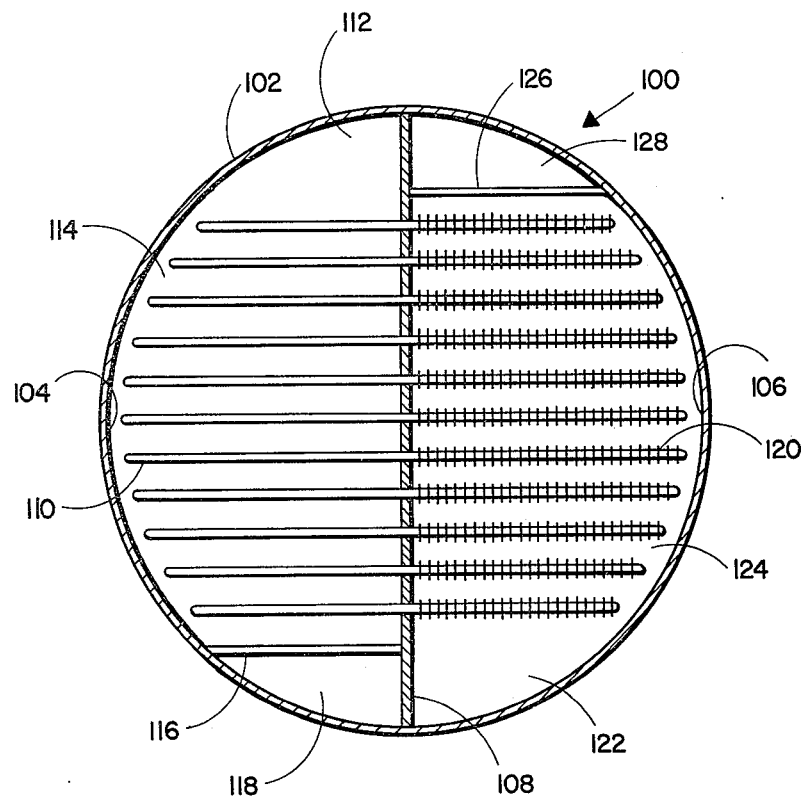
FIG. 3 is a schematic cross section of the tray and heat pipe layout for a second preferred embodiment of this invention.

Referring now more particularly to FIG. 3, a second preferred embodiment of the distillation apparatus of this invention is illustrated schematically in cross section herein at 100 as a closed vessel 102 segregated by a divider 108 into a stripping section 104 and a rectifying section 106. A plurality of heat pipes shown generally at 110 transect divider 108 for the purpose of transferring thermal energy from rectifying section 106 to stripping section 104. Operationally, each of stripping section 104 and rectifying section 106 operate similarly to stripping section 14 and rectifying section 16, respectively, (FIG. 2).

The primary difference between the apparatus illustrated in FIG. 3 and that illustrated in FIG. 2 is that the configuration shown in FIG. 3 is modified with respect to the flow path of the liquid traversing each of the stripping section 104 and rectifying section 106. In both instances, the liquid (not shown) flows parallel to divider 108. The flow path for liquid through stripping section 104 is between an inlet 112 from an overhead downcomer (not shown) across tray 114 and over an outlet weir 116 into a downcomer 118 to the next succeeding tray therebelow. Correspondingly, countercurrent flow of liquid through rectifying section 106 is achieved by incoming fluid from an inlet 122 flowing across tray 124 over an outlet weir 126 into downcomer 128. Clearly, of course, any suitable flow arrangement can be made for the suitable contact between the liquid and vapor phases in each of trays 114 and 124.

Importantly, heat pipes 110 transfer thermal energy from rectifying section 106 into stripping section 104. To further improve thermodynamic efficiency, a plurality of fins, shown herein schmatically as fins 120 on heat pipe 110, can be used to assist in conducting thermal energy into heat pipes 110 wherein the thermal energy is then transferred into stripping section 104. As set forth hereinbefore, the orientation of heat pipes 110 with respect to each of stripping section 104 and rectifying 106 may be any suitable orientation for the appropriate transfer of thermal energy.

Figure 4:
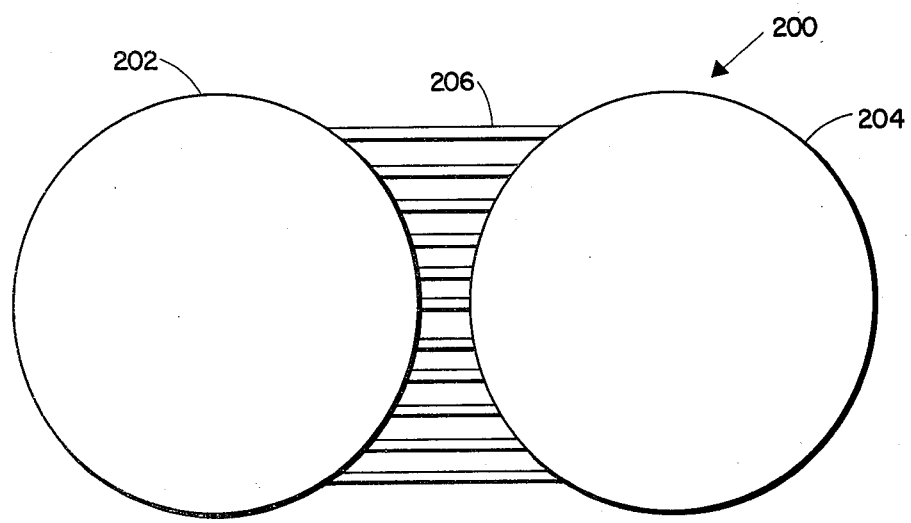
FIG. 4 is a schematic plan view of a third preferred embodiment of the distillation apparatus of this invention with the stripping section and rectifying section configurated as separate vessels and having heat pipes therebetween.

Referring now more particularly to FIG. 4, a third preferred embodiment of the distillation apparatus of this invention is shown generally at 200 and includes a stripping section 202 configured as a separate, closed vessel and a rectifying section 204 also configurated as a separate, closed vessel. A plurality of heat pipes, shown here schmatically at heat pipes 206 suitably interconnect rectifying section 204 with stripping section 202 for the purpose of transferring thermal energy from rectifying section 204 into stripping section 202. Suitable insulation (not shown) may also be enclosed about heat pipes 206 thereby further enhancing the thermodynamic efficiency of this third preferred embodiment of the invention.

From the foregoing, it is clear that thermodynamic efficiencies achieved with secondary reflux and vaporization are substantially enhanced by the simplified construction and design provided by the incorporation of heat pipes therein. Importantly, the heat pipes transfer thermal energy from the rectifying section into the stripping section, the rectifying section being operated at a higher pressure to accommodate the necessary temperature differential between the two sections.

Clearly, the apparatus set forth in each of FIGS. 2–4 is illustrative only and describes only the simpler distillation apparatus. However, the inventive concept is equally applicable to distillation processes involving multiple feed streams, multiple product streams, multiple side streams and multiple columns.

The invention may be embodied in other specific forms without departing from the spirit or essential characteristics. The described embodiments are to be considered in all respects only as illustrative and not restrictive and the scope of the invention is, therefore, indicated by the appended claims rather than by the foregoing description. All changes that come within the meaning and range of equivalency of the claim are to be embraced within their scope.

What is claimed and desired to be secured by a United States Letters Patent is:

1. A distillation apparatus comprising:
   a vertical column;
   a longitudinal divider completely segregating the column into a stripping section and a rectifying section, the divider allowing each of the stripping section and the rectifying section to be maintained at different pressures; and
   a plurality of heat pipes transecting the divider and extending between the stripping section and the rectifying section for transferring thermal energy from the rectifying section to the stripping section.

2. A distillation apparatus comprising:
   a closed vessel configurated as a vertically oriented column;
   divider means in the column for segregating the vessel into a stripping section and a rectifying section, the divider means being operable to accommodate the stripping section being operated at a first pressure and the rectifying section at a second pressure;
   vapor/liquid contacting means in each of the stripping section and the rectifying section; and
   a plurality of heat pipes passing through the divider means for transferring thermal energy from the rectifying section to the stripping section.

3. A method for improving thermodynamic efficiency during the continuous distillation of multicomponent fluid mixtures comprising:
   vertically orienting a closed vessel;
   segregating the vessel with a longitudinal divider into a stripping section and a parallel rectifying section, the divider accommodating maintaining different pressures in the stripping section and the rectifying section;
   forming a plurality of vapor/liquid contact stages in each of the stripping section and the rectifying section;

mounting a plurality of heat pipes between the stripping section and the rectifying section thereby thermally interconnecting at least some of the vapor/liquid contact stages of the stripping section with at least some of the vapor/liquid contact stages of the rectifying section with the plurality of heat pipes;

introducing a multicomponent fluid mixture into the stripping section adjacent the upper end of the stripping section as a feed stream;

separating vapor from the multicomponent fluid mixture in the stripping section during passage through the vapor/liquid contact stages, said vapor representing a lower boiling point fraction of the feed stream;

operating the rectifying section at a first pressure and at a higher temperature than the stripping section by removing said vapor from the stripping section and compressing said vapor to a second pressure prior to introducing said vapor into the rectifying section;

condensing vapor from the rectifying section and recycling a portion of the condensed vapor as a reflux liquid into the rectifying section; and transferring thermal energy from the rectifying section to the stripping section with the plurality of heat pipes thereby conserving energy during the continuous distillation of said feed stream.

4. The method of claim 3 wherein the condensing step comprises removing heat of vaporization from the rectifying section with the heat pipes and directing said heat of vaporization with the heat pipes into the stripping section thereby producing vapor in the separating step.

5. The method defined in claim 3 wherein said operating step further comprises recycling liquid from the bottom of the rectifying section to the stripping section by lowering the pressure of the liquid prior to introducing the liquid into the stripping section.

* * * * *